(12) United States Patent
Ruokonen (10) Patent No.: US 12,056,828 B2
(45) Date of Patent: Aug. 6, 2024

(54) SMARTPHONE, A HOST COMPUTER, A SYSTEM AND A METHOD FOR A VIRTUAL OBJECT ON AUGMENTED REALITY

(71) Applicant: DESIGENCE OY, Helsinki (FI)

(72) Inventor: Arto Ruokonen, Järvenpää (FI)

(73) Assignee: DESIGENCE OY, Helsinki (FI)

( * ) Notice: Subject to any disclaimer, the term of this patent is extended or adjusted under 35 U.S.C. 154(b) by 171 days.

(21) Appl. No.: 17/602,653

(22) PCT Filed: Apr. 7, 2020

(86) PCT No.: PCT/FI2020/050227
§ 371 (c)(1),
(2) Date: Oct. 8, 2021

(87) PCT Pub. No.: WO2020/208302
PCT Pub. Date: Oct. 15, 2020

(65) Prior Publication Data
US 2022/0172442 A1 Jun. 2, 2022

(30) Foreign Application Priority Data
Apr. 11, 2019 (FI) ..................................... 20195293

(51) Int. Cl.
*G06T 19/00* (2011.01)
*G06F 3/01* (2006.01)
*G06F 3/04815* (2022.01)
*G06F 3/04847* (2022.01)
*G06T 19/20* (2011.01)

(52) U.S. Cl.
CPC ............ *G06T 19/006* (2013.01); *G06F 3/013* (2013.01); *G06F 3/04815* (2013.01); *G06F 3/04847* (2013.01); *G06T 19/20* (2013.01); *G06T 2200/24* (2013.01); *G06T 2219/024* (2013.01); *G06T 2219/2021* (2013.01)

(58) Field of Classification Search
CPC ... G06T 19/006; G06T 19/20; G06T 2200/24; G06T 2219/024; G06T 2219/2021; G06F 3/013; G06F 3/04815; G06F 3/04847; G06F 3/011; G06F 2203/011; G06F 3/01; G06F 3/048; G06Q 10/101; G06Q 30/02; G06Q 30/0201; G02B 27/0093
See application file for complete search history.

(56) References Cited

U.S. PATENT DOCUMENTS

| | | | |
|---|---|---|---|
| 2017/0178045 A1* | 6/2017 | Wasik | G06Q 10/06393 |
| 2019/0107990 A1* | 4/2019 | Spivack | G06T 11/60 |
| 2020/0110936 A1* | 4/2020 | Hares | A61B 1/3132 |
| 2020/0322820 A1* | 10/2020 | Carter | H04L 43/50 |

* cited by examiner

*Primary Examiner* — Chong Wu
(74) *Attorney, Agent, or Firm* — McDonnell Boehnen Hulbert & Berghoff LLP (57) ABSTRACT

Human behavioural characteristics in an augmented reality session having a product under development are detected. The characteristics are transformed into performance metrics that together with identified product features define metrics for each feature. A smartphone (110), a system and a method for a virtual object on the augmented reality are disclosed. The user (230) examines the new design or product in the augmented reality environment, for example, where features of the design are presented in a relatable context or in a familiar environment. The user (230) may control the virtual object on the augmented reality view by a display device, for example, by a smartphone.

15 Claims, 5 Drawing Sheets

SMARTPHONE, A HOST COMPUTER, A SYSTEM AND A METHOD FOR A VIRTUAL OBJECT ON AUGMENTED REALITY

CROSS REFERENCE TO RELATED APPLICATION

This application is a U.S. National Phase of International Application No. PCT/FI2020/050227, filed Apr. 7, 2020, which claims priority to Finnish Patent Application No. 20195293, filed Apr. 11, 2019, both of which are incorporated by reference herein in their entirety.

BACKGROUND

Developing consumer products is highly competitive, wherein differentiation between competing products may be essential. Products are formed of multiple features, design choices and/or selections of price point. Small differences may amount to great gains or losses.

Virtual reality objects and augmented reality objects may be used for illustrating new designs and product development. One known solution for testing the appeal of new products or designs is to present them to a test group and simply ask for feedback. The feedback may be analysed by statistical analysis on a database of product shape information and identifying product characteristics based on statistical relationships among the shapes in the product database. Virtual illustration in the augmented reality may reduce product design costs significantly, as various iterations of the product may be implemented only in the virtual environment.

Simple feedback requests may lead to false positive response from the test group. For example, the questionnaire may be biased to expect certain answers from the test group. The questionnaire may focus on details that the focus group deems less important. The focus group could find one particular feature of the product or design very fascinating, but the test setup may overlook that aspect. People may not even realize the most important features of a product, as they may be interacting with the product in ways they do not recognize. Verbal responses may be vague and misleading.

Studies have shown that a particular feature set in the product may be crucial for the commercial success. Traditional feedback requests do not convey any emotional or visceral reactions the consumer may have to a product or the new design.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The human behavioural characteristics in an augmented reality session having a product under development are detected. The characteristics are transformed into performance metrics that together with identified product features define metrics for each feature. A smartphone, a system and a method for a virtual object on the augmented reality are disclosed. The user examines the new design or product in the augmented reality environment, for example, where features of the design are presented in a relatable context or in a familiar environment. The user may control the virtual object on the augmented reality view by a display device, for example, by a smartphone.

The user's actions are recorded during the augmented reality session. The user may walk or move around the product and focus on interesting areas. The user may choose an appealing point of view that is detected by the smartphone. The user's actions are stored as performance metrics. The user's vital signs may be recorded and combined with the visual information displayed in the augmented reality. Examples of recordable vital signs are pupillary responses, facial expressions, breathing cycle or heartbeat. The vital signs may be monitored by a smartwatch or any other device connectable to the smartphone. The user's line-of-sight on the display may be detected—if the display shows multiple features or areas simultaneously and the user focuses on just one area, the smartphone may store the period and the area on which the user focuses. That area or the feature in that area is assigned with performance metrics on user interaction.

The augmented reality view has graphical, interactive elements that the user may operate during the session. The user may choose between different colours or alternative, predefined shapes. Alternatively, or in addition, the user may switch between multiple features on the product and see the visualization in the augmented reality. Each variation of the feature gets performance metrics based on the user's interest or reaction.

The performance metrics are, for example, periods of time that the user has spent examining specific features, the level of interest in the feature according to the detected behavioural pattern or vital signs, focus on product feature or the lack of interest in the feature. The performance metrics are transmitted to a host computer that receives the information from multiple users. The host computer analyses the performance metrics. The host computer may perform statistical analysis, conjoint analysis or analysis based on artificial intelligence.

Gathering consumer data or translating the voice of the customer to a new product or design is prone to errors and distortions. The present solution reduces the errors by adding another layer to the analysis by associating the analysis of human behavioural models to product features. The augmented reality is simple to launch to a large number of consumers by a smartphone application or similar software distribution method. Various statistical analysis methods may be corrected by the information received from the human interaction during the augmented reality session with the virtual product or design under development.

Many of the attendant features will be more readily appreciated as they become better understood by reference to the following detailed description considered in connection with the accompanying drawings. The embodiments described below are not limited to implementations which solve any or all the disadvantages of examining products or designs on augmented reality.

BRIEF DESCRIPTION OF THE DRAWINGS

The present description will be better understood from the following detailed description read in light of the accompanying drawings, wherein

FIG. 2b is a detail view of FIG. 2a;

Like reference numerals are used to designate like parts in the accompanying drawings.

DETAILED DESCRIPTION

The detailed description provided below in connection with the accompanying drawings is intended as a description of the present examples and is not intended to represent the only forms in which the present example may be constructed or utilized. However, the same or equivalent functions and sequences may be accomplished by different examples.

Although the present examples are described and illustrated herein as being implemented in augmented reality environment, the device, the host computer, the system or the method described are provided as an example and not a limitation. As those skilled in the art will appreciate, the present examples are suitable for application in a variety of different types of consumer research activities in virtual environments. For example, the augmented reality illustration may be completely virtual, wherein the virtual reality session is to be deemed as one example of the augmented reality environment.

Figure 1:
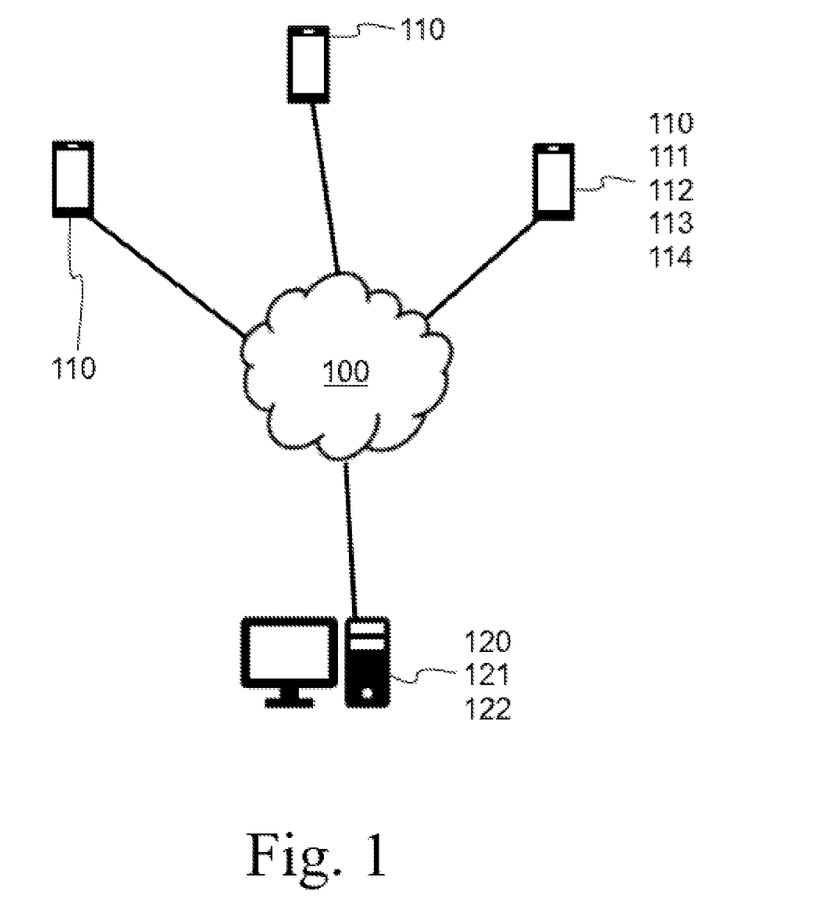
FIG. 1 illustrates schematically one exemplary embodiment of multiple client devices connected to a host computer.
Figure 2A:
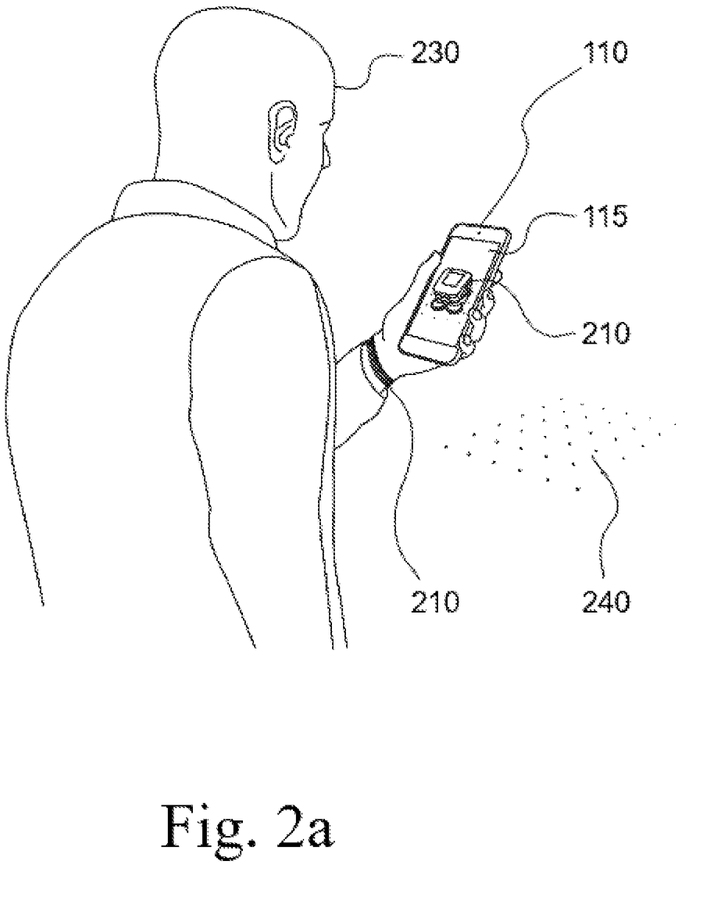
FIG. 2a illustrates schematically one exemplary embodiment and a use scenario of an augmented reality session for a user.

FIG. 1 illustrates schematically one exemplary embodiment of multiple client devices 110 connected to a host computer 120. Each client device 110 may be used by different users. Client devices 110 comprise at least one processor 111 and a memory 112 for storing instructions that, when the instructions are executed, cause the client device 110 to perform the functionality described herein. The host computer 120 may reside at least partially in a cloud computing environment. The host computer 120 comprises at least one processor 121 and a memory 122 for storing instructions that, when the instructions are executed, cause the host computer 120 to perform the functionality described herein. A transceiver 113 is configured to provide a communication link from the client devices 110 to the host computer 120. In one embodiment, the client devices 110 are smartphones. Smartphone cameras 114 are one example of imaging devices that may be used to detect the user's behaviour, pupillary response, emotions or vital signs. The camera 114 may capture a sequence of images of the user, detect and analyse various characteristics of the user's actions. The client device may comprise multiple linked or interconnected devices, such as the smartphone 110 and a smartwatch 210 illustrated in FIG. 2.

FIG. 2a illustrates schematically one exemplary embodiment and a use scenario of an augmented reality session for a user 230. The user 230 is one example of a consumer participating in the product development or design process, providing feedback of a prototype solution. The user 230 is informed about an intention to gather data and observations on human behaviour before launching the augmented reality session on the client device 110. In this example, the client device 110 is a smartphone configured to provide an augmented reality view of a virtual object 220 on a display 115.

The smartphone camera 114 is pointed towards a space 240, wherein the virtual object 220 is desired to appear. The user 230 may select and adjust the virtual object 220 position by moving it along the augmented reality view with a graphical, interactive user interface object. In one example, the user interface object is a soft button or a slider appearing on the smartphone 110 display 115. The user 230 may apply various gestures to move or scale the virtual object 220. The user 230 may move around the virtual object 220 and visualize the virtual object 220 from various angles or distances. The space 240 may be a natural environment for the virtual object 220, providing context to the user's behavioural response and improving the accuracy of the response. The client device 110 records all movements and periods of time in each position when the user 230 observes the virtual object 220. The client device 110 may record various parameters of the user's 230 interaction with the virtual object 220 in the augmented reality session.

The client device 110 has at least one object feature defined on the virtual object 220. Examples of various object features are different sides of the virtual object 220, different colours, alternative shapes or alternative accessories. In one embodiment, the user 230 may select the object feature or switch between alternatives using the graphical user interface, such as soft buttons.

The object features may be defined before starting the augmented reality session and provided to the client device by the host computer 120. In one embodiment, the object features are distributed to client devices 110 via an application update procedure. The object features are properties of the product that may be influenced by the consumer research. The object features may be visual objects presented on the display, sounds or any tactile feedback, such as vibrations provided by the client device 110. As one example, the virtual object 220 may comprise different engine alternatives that provide different sounds. The user may wear headphones connected to the client device 110 for an immersive experience. For an added immersive experience, the client device 110 may comprise virtual reality glasses that, when worn by the user 230, provide a three-dimensional view in virtual reality or augmented reality. The virtual reality is a subset of augmented reality as the real-world context may be omitted from the view.

The user interactions may be recorded by a camera 114 as still images or video clips, by accelometer data, client device 110 orientation, the speed of the client device 110 movements around the virtual object 220 or any physiological phenomenon recorded by the camera 114 or a sensor connected to the user 230. The user interactions are combined with the information provided to the user 230 during the augmented reality session, for example, by timestamping each action and identified orientation of the virtual object 220, sound or tactile response. The user interaction on the object feature of the virtual object 220 provides one example of a performance metric for the object feature. The user interaction on the object feature may have an identifiable reaction, such as eye movement, gasp, raised breathing rate or prolonged time focusing on single feature. The client device 110 sends the formed performance metrics for the object feature to the host computer 120.

The client device 110 may use artificial intelligence information to detect gestures or responses on the object feature. The client device 110 may receive the artificial intelligence network information from the host computer, where a neural network has learned to detect human response to the virtual object from a large data set. Responses, such as pupillary size, increased breath rate, blushing or any detectable physiological reaction, may be stored into the host computer 120 database. In one embodiment, the host computer 120 database is used for teaching the neural network.

The neural network may be taught to detect typical responses for each object feature. The expected behaviour of users 230 may be updated to the client device 110. If the client device detects a non-typical behavioural response to the object feature, the client device may launch a query to the user 230, for example, requesting a spoken or written response or explanation of the non-typical response. Any spoken or written response received from the user 230 may be stored to the database and examined separately. The non-typical behaviour may reveal a new user segment or angle to the product or design.

Figure 2B:
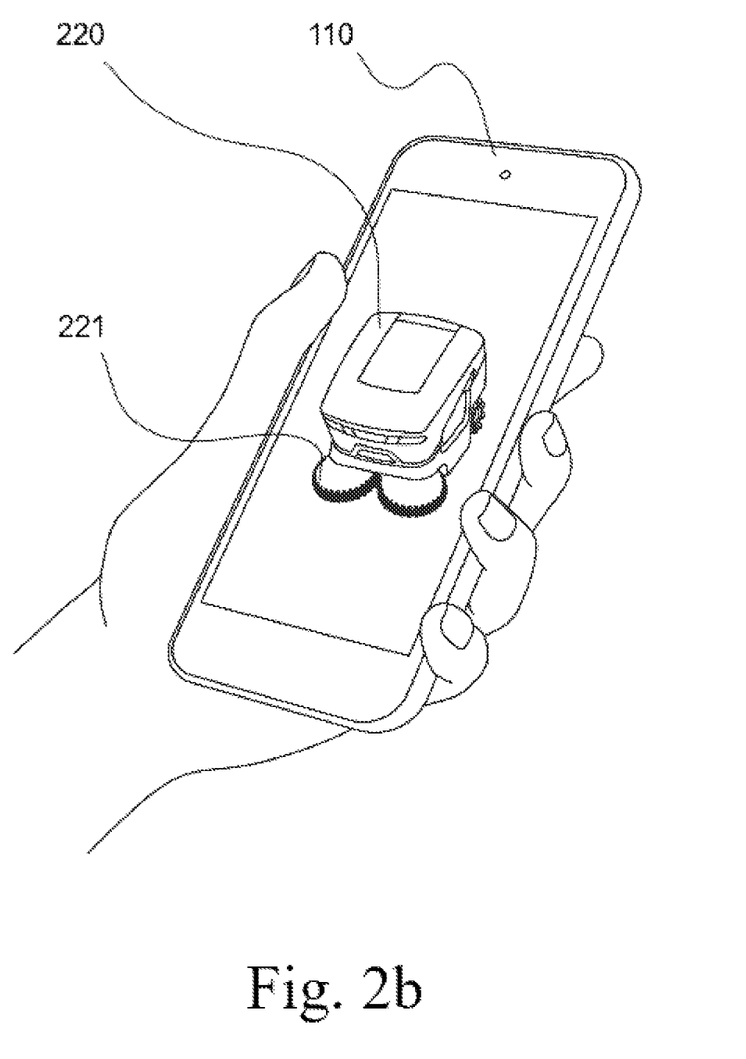

In one exemplary embodiment, the client device 110 defines at least one object feature based on detecting the user interaction at a point of view to the virtual object 220. FIG. 2b is a detail view of FIG. 2a, wherein the virtual object 220 is a floor cleaning machine, and the user's 230 line-of-sight is focused to the front portion with two brushes 221. The object feature is defined by the point of view, and as the brushes 221 have been previously configured as one object feature, the client device 110 detects the user's interaction to be assigned to the brushes 221. The virtual object 220 may be divided into a grid, where the grid size or shape may be modified as a response to the collected performance metrics.

Figure 3A:
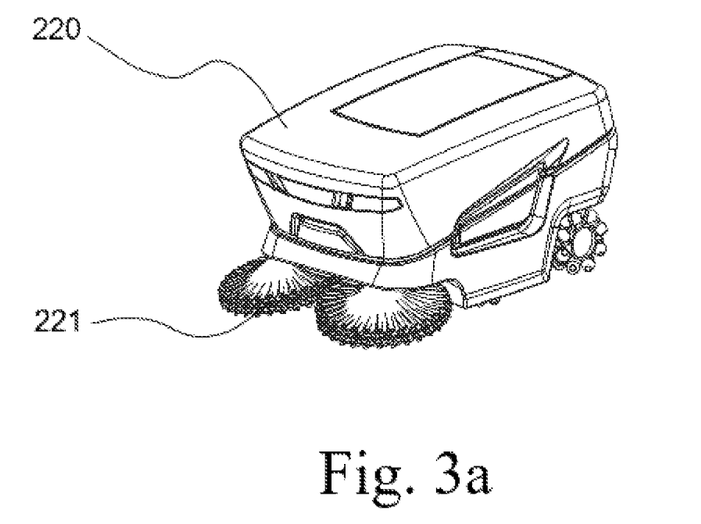
FIG. 3a illustrates schematically one exemplary embodiment of a virtual object having an object feature.
Figure 3B:
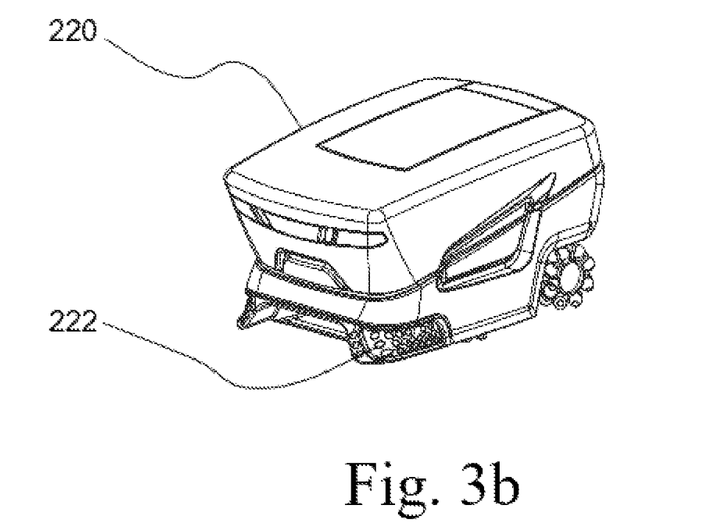
FIG. 3b illustrates schematically one exemplary embodiment of the virtual object having an alternative object feature.
Figure 4A:
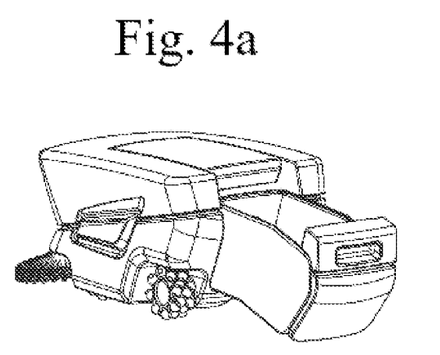
FIG. 4a illustrates schematically one exemplary embodiment of the virtual object having the alternative object feature as a first bin version.
Figure 4B:
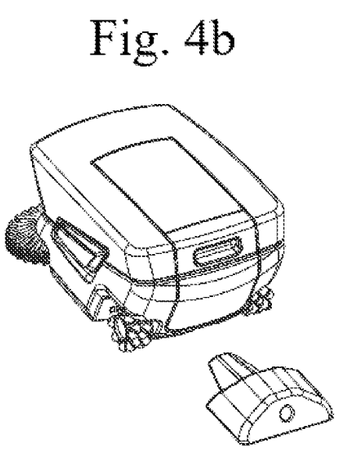
FIG. 4b illustrates schematically one exemplary embodiment of the virtual object having the alternative object feature as a second bin version.
Figure 4C:
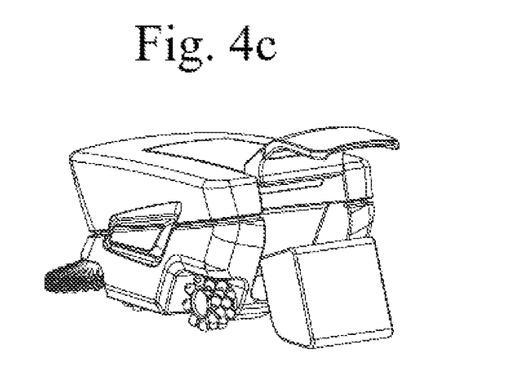
FIG. 4c illustrates schematically one exemplary embodiment of the virtual object having the alternative object feature as a third bin version.
Figure 4D:
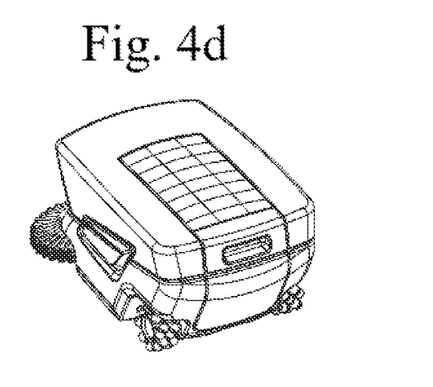
FIG. 4d illustrates schematically one exemplary embodiment of the virtual object having the alternative object feature as a fourth bin version.

In one embodiment, the client device 110 modifies the object feature to a second object feature in response to the user interaction on the user interface object. For example, the smartphone display has a soft button in the augmented reality view that may be used to select alternative features. FIG. 3a and FIG. 3b illustrate schematically one exemplary embodiment of a virtual object having an alternative feature. The floor cleaning machine 220 according to FIG. 3a has two wide and flat brushes 221. By selecting the soft button on the smartphone display 115 the augmented reality session switches to an alternate cleaning device, a vacuum 222 illustrated in FIG. 3b. The vacuum 222 is elongated in shape, more agile and loud compared to the brushes 221. The functionality may be illustrated in the augmented reality session, for example, having the brush and vacuum generate different sounds when operated. The user's 230 reactions are recorded during the moment when the brushes are switched. The reaction may be positive or negative. The client device 110 provides performance metrics for the second object feature according to the detected reactions.

In one embodiment, the client device 110 is configured to detect an area on the virtual object 220 on which the user focuses. Again, referring to FIG. 2a, the user 230 is looking at the top portion of the floor cleaning machine 220. The top portion may have been deemed a non-important feature, when the product development team has configured the augmented reality session. As the client device 110 detects that the user 230 is interested in the top portion of the virtual object, the top portion is defined as one object feature. The host computer 120 may not know at this point that the top portion has been detected in one augmented reality session as one object feature. The client device 110 sends the information of the newly identified object feature to the host computer 120. In one exemplary embodiment, the host computer adds the new object feature into the configuration data to be sent to other client devices 110 during an update procedure. Alternatively, or in addition, the host computer 120 may apply the new object feature information to teach the neural network. If multiple client devices 110 send similar data, a new object feature to the host computer 120, the neural network learns that this feature is added to the configuration data to be updated to all client devices. With this functionality, the system may detect and start taking into account new features that the product development team may have overlooked.

In one embodiment, the camera 114 of the client device 110 is configured to detect pupillary responses of the user 230. The client device 110 may comprise multiple cameras 114 on different sides of the client device 110 body or use one camera to capture a wide view from multiple sides. The camera 114 may detect the eye movement, dilated or constricted pupils or the line-of-sight. The client device 110 may use consecutive still images or video information to decode the pupillary response information. In one embodiment, the pupillary response is used to detect the user's emotions when observing the new product or design. In one embodiment, the user's facial expressions may be used. Artificial intelligence detects with the help of neural networks typical pupillary responses or facial expressions. The artificial intelligence may be taught from a large number of samples to differentiate various human emotions. The emotional response derived from the pupillary response or the facial expression is tagged along with the action the user is performing on the product or design. The emotional response may be later used to verify the captured data with complementary analysis methods.

The client device 110 detects the position in the display 115 where the user 230 focuses his/her sight, and provides performance metrics based on the position that the user 230 has selected by looking at the specific portion of the virtual object 220. The client device 110 calculates the line-of-sight position on the display 115 to match the area on the virtual object 220, and to assign that area for performance metrics.

In one embodiment, the client device 110 provides a query on the user interface after detecting an area on the virtual object that the user 230 focuses on. The query may be asking from the user 230 a reason for focusing on the area. The query may be a text on the display or a text-to-speech from the client device 110. The response may be recorded as a typed response or by recording a spoken response from the user 230. The user 230 may or may not provide the answer, wherein the client device sends the recorded response to the host computer 120 database. The host computer 120 may analyse the response and detect if the response was due to user's 230 excitement or, as one example, the user 230 being bored.

In one embodiment, the client device 110 comprises distributed devices that are connected by wire or wirelessly. The distributed devices may be used to detect various responses from the user 230 during the augmented reality session. For example, vital signs, such as heart rate, breathing rate, blood pressure or sweating, may be detected by various sensors. The user 230 may provide feedback as gasps or direct speech response that is recorded by a microphone. In one embodiment, the sensors are embedded in the smartwatch 210 that is wirelessly connected to the smartphone 110. In one embodiment, dedicated sensors, such as electrodes, are used to gather the physiological data from the user 230. The physiological data is combined with the visual and/or audio information from the client device 110 as one example of the performance metrics. The data may prove that the user is excited or annoyed by a specific object feature. The information is formed into performance metrics related to that object feature and sent to the host computer 120. The physiological response may be measured by the smartphone 110, wherein the deployment of the consumer research is fast via a smartphone application, while providing rich data as feedback.

In one embodiment, the client device 110 detects when the user 230 loses interest to the virtual object 220. This may indicate that the user 230 is bored and the final point of interest is not interesting to the user. The final point of interest may score low performance metrics.

In one embodiment, the client device 10 is configured to detect the path of interesting areas on the virtual object 220. The path may lead across multiple areas of interest. The path information is sent to the host computer 120. The host computer 120 may apply the path information to teach the neural network. If multiple client devices 110 send similar data, the path data to the host computer 120, the neural network learns that this data is added to the configuration data to be updated to all client devices. The path may be provided as a graph between various areas of the virtual object 220. Depending on the product or design to be developed, the path may be an important feature to users and, for example, a smooth transition or guide to highlight the path may be added into the design or product.

The host computer 120 receives the performance metrics from multiple client devices 110. The host computer may provide configuration data to client devices, setting up the augmented reality session for consumer research. As the deployment via smartphone application or similar software distribution method is fast and effective, a large number of participants may take part in the consumer research. The host computer 120 is configured to rank the at least two object features according to the received performance metrics received from multiple client devices 110. The host computer analyses the performance data and displays the at least two object features in a ranked order. As a result, the product development team discovers the most important features that the consumers value the most. The consumer research sent to the users 230 may comprise an additional questionnaire asking for price points that the users might be willing to pay. As the user's direct response is added to the data, at least a portion of the false data may be filtered from the results. The system of client devices 110 and the host computer 120 may be used to improve the reliability of traditional consumer research methods.

A computer-implemented method for providing information on a virtual object on augmented reality comprises multiple client devices 110. A large number of users provide a big data sample that may be effectively used to improve the consumer research accuracy. The method comprises defining at least one object feature on the virtual object. The object features may be configured into the host computer 120 that sends the configuration data to multiple client devices 110. The first set of object features may be defined by the product development team. The method comprises a step of providing performance metrics for the object feature from the user interaction, how the user 230 perceived the object feature in the augmented reality environment. The host computer 120 may utilize a neural network that learns from the user responses and improves the configuration data to add new object features or delete an old object feature that has received low performance metrics from the users 230. The updated object features may be sent to new client devices 110 or the previous participants may be asked to look at the new evolution version again.

The configuration data comprises a three-dimensional model of the virtual object and multiple object features. Alternate object features may be included and the user 230 may select the desired set of features to the virtual object. The total characteristics of the virtual object may change as the user 230 selects between object features. The virtual object model may provide different sounds and the behaviour may change. FIGS. 4a-4d illustrate one exemplary virtual object with multiple alternate object features. Returning to the example of a floor cleaning machine, the bin is illustrated with four alternatives. The bin size affects the machine's sound and operating speed. As the user 230 examines the operation, the response is recorded and sent to the host computer 120.

One example of the virtual object and object features is related to service processes. Service process objects are information boards having various features, such as font size, colour or placement; payment terminals having various usability features; restaurant queuing or buffet selection; ticket purchase; or construction site management and logistics.

In one embodiment, the method comprises steps of ranking the at least two object features according to the received performance metrics and displaying the at least two object features in a ranked order. The ranking may be done by various statistical methods that calculate and evaluate the performance metrics of alternative object features or the total set of object features to be implemented into the product.

In one embodiment, the method comprises providing a conjoint analysis of the received performance metrics. Conjoint analysis helps determine how people value different attributes, such as feature, function or benefits, that make up an individual product or service. The objective of a conjoint analysis is to determine what combination of a limited number of attributes is most influential on respondent choice or decision making. A controlled set of potential products or services is shown to survey respondents and by analysing how they form preferences between these products, the implicit valuation of the individual elements making up the product or service can be determined. When the conjoint analysis is combined with the performance metrics received from the interaction with the product or design from each individual user, the conjoint analysis may be corrected. The solution described hereinbefore improves the reliability of market surveys and mitigates the risk of design failures.

A smartphone is disclosed, comprising: a camera; a display; a transceiver for communicating with a host computer; and at least one processor and a memory storing instructions that, when executed, cause the smartphone to provide an augmented reality view of a virtual object on the display; provide a graphical, interactive user interface object with which the user interacts in order to control the virtual object on the augmented reality view; and store information about the virtual reality view and the user interaction in the memory; define at least one object feature on the virtual object; provide performance metrics for the object feature from the user interaction on the object feature of the virtual object; and send the performance metrics for the object feature to the host computer. In one embodiment, the at least one processor and the memory storing instructions, when the instructions are executed, cause the smartphone to define at least one object feature based on detecting the user interaction at a point of view on the virtual object. In one embodiment, the at least one processor and the memory storing instructions, when the instructions are executed, cause the smartphone to modify the object feature to a second object feature in response to the user interaction on the user interface object; and provide performance metrics for the second object feature. In one embodiment, the at least one processor and the memory storing instructions, when the instructions are executed, cause the smartphone to detect an area on the virtual object that the user focuses on and to define the area as one object feature. In one embodiment, the at least one processor and the memory storing instructions, when the instructions are executed, cause the smartphone to, provide a query on the user interface after detecting an area on the virtual object that the user focuses on. In one embodiment, the at least one processor and the memory storing instructions, when the instructions are executed, cause the smartphone to: capture, by the camera, consecutive images of the user during the user interaction with the virtual object; detect pupillary response or facial expression of the user during the user interaction with the virtual object; detect an area on the virtual object that the user views during the pupillary response; and provide performance metrics for the object feature at said area. In one embodiment, the at least one processor and the memory storing instructions, when the instructions are executed, cause the smartphone to: connect via the transceiver to a smartwatch configured to monitor at least one vital sign of the user; receive, from the smartwatch, consecutive vital signs of the user during the user interaction with the virtual object; detect a deviation in consecutive vital signs of the user during the user interaction with the virtual object; detect an area on the virtual object that the user views during the deviation in consecutive vital signs; and provide performance metrics for the object feature at said area. In one embodiment, the at least one processor and the memory storing instructions, when the instructions are executed, cause the smartphone to detect a final point of interest of the user on the virtual object after the user interaction with the virtual object has concluded; detect an area on the virtual object that the user focused on as the final point of interest; and provide performance metrics for the object feature at said area. In one embodiment, the at least one processor and the memory storing instructions, when the instructions are executed, cause the smartphone to: define as one performance metrics a path comprising consecutive areas of interest in the virtual object during the user interaction with the virtual object. In one embodiment, the graphical user interface is a slider for the user to select the performance metrics on the object feature.

Alternatively, or in addition, a host computer is disclosed. The host computer is configured to receive information from multiple smartphones described hereinbefore. The host computer comprises a transceiver for communicating with the smartphones; and at least one processor and a memory storing instructions: characterized in that the at least one processor and the memory storing instructions, when the instructions are executed, cause the host computer to: rank the at least two object features according to the received performance metrics; and display the at least two object features in a ranked order. In one embodiment, the at least one processor and the memory storing instructions, when the instructions are executed, cause the host computer to: rank the at least two object features according to the received performance metrics; and display the at least two object features in a ranked order.

Alternatively, or in addition, a system comprising the smartphone described hereinbefore and the host computer described hereinbefore is disclosed.

Alternatively, or in addition, a computer-implemented method for a virtual object on augmented reality is disclosed. The method steps are executed by multiple smartphones described hereinbefore and the host computer described hereinbefore. The method comprises defining at least one object feature on the virtual object; providing performance metrics for the object feature from the user interaction on the object feature of the virtual object; and sending the performance metrics for the object feature to the host computer. In one embodiment, the method comprises ranking the at least two object features according to the received performance metrics; and displaying the at least two object features in a ranked order. In one embodiment, the method comprises providing a conjoint analysis on the received performance metrics.

Alternatively, or in addition, the controlling functionality described herein can be performed, at least in part, by one or more hardware components or hardware logic components. An example of the augmented reality system described hereinbefore is a computing-based device comprising one or more processors which may be microprocessors, controllers or any other suitable type of processors for processing computer-executable instructions to control the operation of the device in order to control one or more sensors, receive sensor data and use the sensor data. The computer-executable instructions may be provided using any computer-readable media that is accessible by a computing-based device. Computer-readable media may include, for example, computer storage media such as memory and communications media. Computer storage media, such as memory, includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device, it will be appreciated that the storage may be distributed or located remotely and accessed via a network or other communication link, for example, by using a communication interface.

The apparatus or the device may comprise an input/output controller arranged to output display information to a display device which may be separate from or integral to the apparatus or device. The input/output controller is also arranged to receive and process input from one or more devices, such as a user input device (e.g. a mouse, keyboard, camera, microphone or other sensor).

The methods described herein may be performed by a software in machine-readable form on a tangible storage medium e.g. in the form of a computer program comprising computer program code means adapted to perform all the steps of any of the methods described herein when the program is run on a computer and where the computer program may be embodied on a computer-readable medium. Examples of tangible storage media include computer storage devices comprising computer-readable media, such as disks, thumb drives, memory etc. and do not only include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Any range or device value given herein may be extended or altered without losing the effect sought.

Although at least a portion of the subject matter has been described in language specific to structural features and/or acts, it is to be understood that the subject matter defined in the accompanying claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or device may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A smartphone, comprising:
   multiple cameras on different sides of the smartphone;
   a display;
   a transceiver for communicating with a host computer; and
   at least one processor and a memory storing instructions that, when executed, cause the smartphone to:
      provide an augmented reality view of a virtual object on the display;
      provide a graphical, interactive user interface object with which a user interacts in order to control the virtual object on the augmented reality view;
      define at least one object feature on the virtual object; and
      store information about the augmented reality view and the user interaction in the memory;
   wherein the at least one processor and the memory storing instructions, when the instructions are executed, cause the smartphone to:
      detect behavioral characteristics of the user for the at least one object feature, from the user interaction on the at least one object feature of the virtual object in the augmented reality view;
      transform the behavioural characteristics into performance metrics; and
      send the performance metrics for the object feature to the host computer.

2. The smartphone according to claim 1, wherein the at least one processor and the memory storing instructions, when the instructions are executed, cause the smartphone to define the at least one object feature based on detecting the user interaction at a point of augmented reality view on the virtual object.

3. The smartphone according to claim 1, wherein the at least one processor and the memory storing instructions, when the instructions are executed, cause the smartphone to
   modify the object feature to a second object feature in response to the user interaction on the user interface object; and
   provide performance metrics for the second object feature.

4. The smartphone according to claim 1, wherein the at least one processor and the memory storing instructions, when the instructions are executed, cause the smartphone to
   detect an area on the virtual object that the user focuses on; and
   define the area as one object feature.

5. The smartphone according to claim 4, wherein the at least one processor and the memory storing instructions, when the instructions are executed, cause the smartphone to provide a query on the user interface after detecting an area on the virtual object that the user focuses on.

6. The smartphone according to claim 1, wherein the at least one processor and the memory storing instructions, when the instructions are executed, cause the smartphone to:
   capture, by a camera, consecutive images of the user during the user interaction with the virtual object;
   detect pupillary response or facial expression of the user during the user interaction with the virtual object;
   detect an area on the virtual object that the user views during the pupillary response; and
   provide performance metrics for the object feature at said area.

7. The smartphone according to claim 1, wherein the at least one processor and the memory storing instructions, when the instructions are executed, cause the smartphone to:
   connect via the transceiver to a smartwatch configured to monitor at least one vital sign of the user;
   receive, via the transceiver, consecutive vital signs of the user during the user interaction with the virtual object;
   detect a deviation in consecutive vital signs of the user during the user interaction with the virtual object;
   detect an area on the virtual object that the user views during the deviation in consecutive vital signs; and
   provide performance metrics for the object feature at said area.

8. The smartphone according to claim 1, wherein the at least one processor and the memory storing instructions, when the instructions are executed, cause the smartphone:

detect a final point of interest of the user on the virtual object after the user interaction with the virtual object has concluded;

detect an area on the virtual object that the user focused on as the final point of interest; and provide performance metrics for the object feature at said area.

9. The smartphone according to claim 1, wherein the at least one processor and the memory storing instructions, when the instructions are executed, cause the smartphone to define as one performance metrics a path comprising consecutive areas of interest in the virtual object during the user interaction with the virtual object.

10. The smartphone according to claim 1, wherein the graphical user interface is a slider for the user to select the performance metrics on the object feature.

11. The host computer of claim 1 configured to receive information from multiple smartphones of claim 1, comprising:

a transceiver for communicating with the smartphones; and at least one processor and a memory storing instructions, wherein the at least one processor and the memory storing instructions, when the instructions are executed, cause the host computer to:

rank at least two object features according to the received performance metrics; and display the at least two object features in a ranked order.

12. A system comprising the smartphone of claim 1 and a host computer configured to receive information from multiple of the smartphones, the host computer comprising:

a transceiver for communicating with the smartphones; and at least one processor and a memory storing instructions, wherein the at least one processor and the memory storing instructions, when the instructions are executed, cause the host computer to:

rank at least two object features according to the received performance metrics; and display the at least two object features in a ranked order.

13. A computer-implemented method for providing information on a virtual object on augmented reality, comprising:

multiple smartphones of claim 1 and a host computer configured to receive information from multiple of the smartphones, the host computer comprising:

a transceiver for communicating with the smartphones; and at least one processor and a memory storing instructions, wherein the at least one processor and the memory storing instructions, when the instructions are executed, cause the host computer to:

rank at least two object features according to the received performance metrics; and display the at least two object features in a ranked order;

wherein the method comprises:

defining, by at least one smartphone, at least one object feature on the virtual object;

detecting behavioural characteristics of the user for the object feature, from the user interaction on the object feature of the virtual object in the augmented reality view;

transforming the behavioural characteristics into performance metrics; and sending the performance metrics for the object feature from said smartphone to the host computer.

14. The method according to claim 13, further comprising:

ranking, by the host computer, the at least two object features according to the received performance metrics; and displaying the at least two object features in a ranked order.

15. The method according to claim 13, further comprising:

providing, by the host computer, a conjoint analysis on the received performance metrics.

* * * * *